Oct. 16, 1923.
W. G. COX
1,470,960
SPRING BUFFER OR BUMPER
Filed Nov. 19, 1921
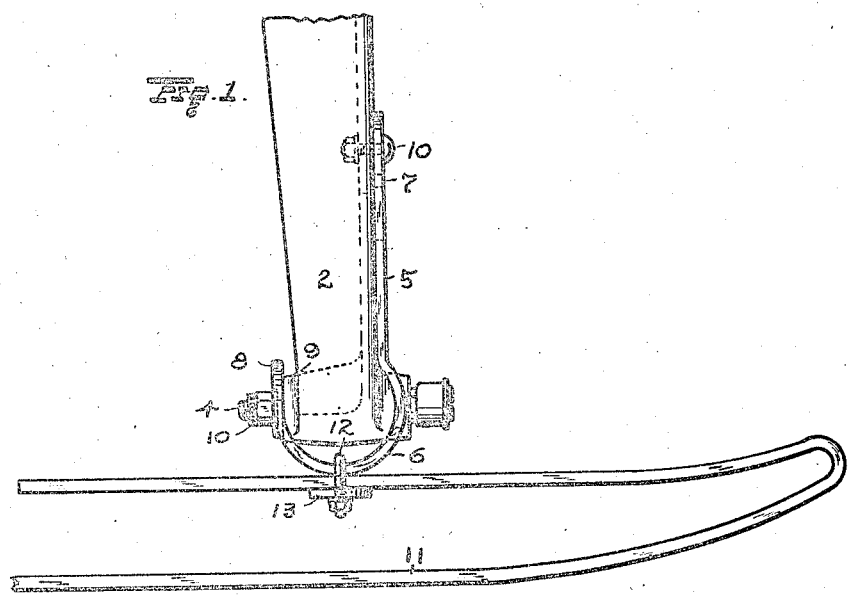
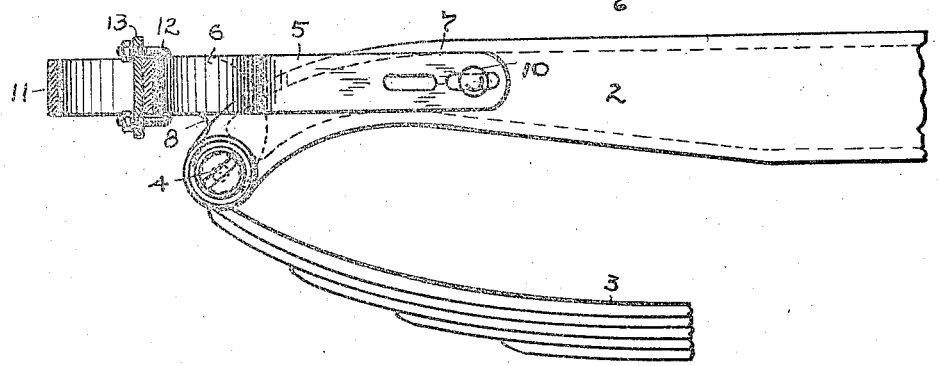
Inventor
W. G. COX.
By Fisher, Moser & Moore
Attorneys Patented Oct. 16, 1923.

1,470,960

UNITED STATES PATENT OFFICE.

WILLIAM G. COX, OF CLEVELAND, OHIO, ASSIGNOR, BY MESNE ASSIGNMENTS, TO THE EATON AXLE AND SPRING COMPANY, OF CLEVELAND, OHIO, A CORPORATION OF OHIO.

SPRING BUFFER OR BUMPER.

Application filed November 19, 1921. Serial No. 516,318.

*To all whom it may concern:*

Be it known that I, WILLIAM G. COX, a citizen of the United States, residing at Cleveland, in the county of Cuyahoga and State of Ohio, have invented certain new and useful Improvements in a Spring Buffer or Bumper, of which the following is a specification.

The general object of the invention is to provide a simple and efficient mode of attaching and mounting a spring buffer or bumper upon the frame or other part of an automobile, whereby the buffer or bumper may bend and flex freely where coupled to the supporting brackets so as to relieve the brackets and couplings from the force of collisions and to prevent breaking of the brackets and coupling connections under shock.

In the drawings accompanying this application, Fig. 1 is a plan view of an end portion of a spring bumper, together with a bracket and coupling embodying my invention, and Fig. 2 is a side view of the parts shown in Fig. 1 with the bumper in cross-section.

In Figs. 1 and 2, I show the end portion 2 of an automobile frame and a spring 3 connected therewith by a shackle bolt 4. A bracket 5, consisting of a flat bar of spring metal bent between its opposite ends into a round loop or arched portion 6, is secured in a straddling position relatively to the curved extremity of frame portion 2, one end 7 of this bracket extending horizontally along one side of frame 2 and the other end 8 being bent downwardly to permit the projecting end of shackle bolt 4 to pass therethrough and to be clamped against boss 9 by the lock nut 10. The straight portion 7 of the bracket is fastened to frame 2 by a bolt 10 of any suitable kind and this end may be slotted as shown or otherwise constructed to facilitate attachment of the bracket to the frame.

The round loop or arched portion 6 of the bracket is curved in a horizontal plane to present a flat round vertical face against which the rear bar or an arm of a buffer or bumper 11 of any kind or style may be clamped, using a U-bolt 12 and strap 13 or its equivalent. The facial contact between the bar and bracket is a substantially linear contact permitting the bumper bar to flex or bend around the round face of the bracket when the force of a collision or blow bends or flexes the bumper either at its middle or end.

In a sense the bumper is free to rock upon each bracket or support to accommodate flexing stresses and strains imposed upon it by sudden shocks and impacts wherever delivered, thus preventing both the bumper and bracket and also the coupling parts from breaking under such conditions. The loop formation of the bracket also affords a spring backing or cushion to absorb a blow, and another advantage is that counterpart brackets having such round loops or bearing arches may be attached universally to either parallel portions of the vehicle frame or to diverging or converging portions of the frame without affecting the alignment of the bumper transversely of the vehicle or the efficiency or working relation of the coupling parts. The projecting ends 2 of automobile frames in general use vary slightly in width and shape, dependent upon the width of the suspension spring 3 used, but the present one-piece bracket 5 may be readily fitted to frame ends of varying width and shape because the loop portion 6 of the bracket is made relatively larger in diameter than the distance between the inner opposing flat sides of the two arms 7 and 8, thereby providing a reverse bend or bowed offset, where loop 6 and long straight arm 7 are joined together. This formation provides a free-flexing spring arm 7 adapted to be spread apart from, or brought nearer to, short arm 8 in attaching the bracket to shackle bolt 4, and in fitting and attaching the longer arm 7 to the outside of frame part 2.

What I claim, is—

1. A buffer or bumper, comprising a flat spring bar, a supporting bracket for each end of said bar having a long straight arm and a short downwardly extending arm connected by a circular loop portion, said loop portion being offset in respect to said long arm to permit lateral spring adjustment of said arm in fitting the bracket to vehicle frame ends of different shapes and widths, and said bar bearing against the front side of each circular loop portion, a U-bolt for each bracket having a round straight portion engaged with the inner rounded side of the loop portion and straight leg portions extending forwardly above and below said bar, a plate engaged with the front side of said bar and connected with the legs of the U-bolt at the front side of each bracket, and locking nuts connected with said legs at the front side of each plate, in combination with means adapted to fasten the arms of each bracket to the frame of an automobile.

2. A buffer or bumper bracket for automobiles, consisting of a flat bar of spring metal bent between its ends into a round loop, one end being relatively short and bent downwardly to permit a shackle bolt connection to be made therewith, and the opposite end being relatively long and extending horizontally and joined to said loop by a reverse bend to permit said arm to be flexed laterally and adjustably fitted to the outer side of the projecting end of a vehicle frame.

In testimony whereof I affix my signature in presence of two witnesses.

WILLIAM G. COX.

Witnesses:
 GEO. E. KRICKER,
 DOROTHY MOSER.